United States Patent
Tanaka

(10) Patent No.: US 7,941,005 B2
(45) Date of Patent: May 10, 2011

(54) INFORMATION PROCESSING APPARATUS AND RESOLUTION ENHANCEMENT PROCESSING CONTROL PROGRAM

(75) Inventor: Akira Tanaka, Mitaka (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/579,926

(22) Filed: Oct. 15, 2009

(65) Prior Publication Data
US 2010/0135593 A1 Jun. 3, 2010

(30) Foreign Application Priority Data

Nov. 28, 2008 (JP) ................................ 2008-304690

(51) Int. Cl.
*G06T 5/00* (2006.01)
*G06K 9/46* (2006.01)

(52) U.S. Cl. ........ 382/299; 382/190; 382/199; 382/263; 345/698

(58) Field of Classification Search .................. 382/299, 382/300, 263, 266, 199, 108, 190; 345/698; 348/14.12

See application file for complete search history.

(56) References Cited

U.S. PATENT DOCUMENTS

| | | | |
|---|---|---|---|
| 6,038,348 A | 3/2000 | Carley | |
| 6,600,517 B1 | 7/2003 | He et al. | |
| 6,714,693 B1 * | 3/2004 | Miyake | 382/300 |
| 2005/0018077 A1 | 1/2005 | De Haan et al. | |
| 2005/0232492 A1 | 10/2005 | Aoyama | |
| 2007/0269137 A1 | 11/2007 | Ida et al. | |
| 2009/0074328 A1 * | 3/2009 | Matsumoto et al. | 382/300 |

FOREIGN PATENT DOCUMENTS

| | | |
|---|---|---|
| JP | 2000-188680 | 7/2000 |
| JP | 3301995 | 4/2002 |
| JP | 2003-283821 | 10/2003 |
| JP | 2006-050481 | 2/2006 |
| JP | 2006-050481 A | 2/2006 |
| JP | 2006-094419 | 4/2006 |
| JP | 2006-094419 A * | 4/2006 |
| JP | 2006-221221 | 8/2006 |
| JP | 2006-221221 A | 8/2006 |
| JP | 2007-310837 | 11/2007 |
| JP | 2007-310837 A | 11/2007 |
| JP | 4116649 B2 * | 4/2008 |
| JP | 2009-070123 | 4/2009 |
| JP | 2009-070123 A * | 4/2009 |
| JP | 4384242 B1 * | 10/2009 |

OTHER PUBLICATIONS

The Notice of Reasons for Rejection for Japanese Patent Application No. 2008-304690 mailed by the Japan Patent Office on Feb. 9, 2010 along with an English translation thereof and Statement of Accuracy of Translation in five (5) pages.*
Explanation of Non-English Language References, Oct. 15, 2009.

* cited by examiner

*Primary Examiner* — Jon Chang
(74) *Attorney, Agent, or Firm* — Knobbe, Martens, Olson & Bear LLP

(57) ABSTRACT

According to one embodiment, an information processing apparatus includes an image quality improvement processing module which applies first image quality improvement processing for image quality enhancement to each of corresponding pixels in the temporary high-resolution image corresponding to a region other than the flat part region, and applies second image quality improvement processing for sharpening to each of corresponding pixels in the temporary high-resolution image corresponding to an edge region which is not located on the texture region. The apparatus further includes a controller which controls at least one of the texture determination reference value applied to the detecting the texture region and the flat part determination reference value applied to the detecting the flat part region based on a predetermined rule.

3 Claims, 11 Drawing Sheets

INFORMATION PROCESSING APPARATUS AND RESOLUTION ENHANCEMENT PROCESSING CONTROL PROGRAM

CROSS-REFERENCE TO RELATED APPLICATIONS

This application is based upon and claims the benefit of priority from Japanese Patent Application No. 2008-304690, filed Nov. 28, 2008, the entire contents of which are incorporated herein by reference.

BACKGROUND

1. Field

One embodiment of the invention relates to a resolution enhancement processing control technique for moving image data, suitably applied to a personal computer or the like, which includes a special playback function of converting a standard definition (SD) image stored in, e.g., a digital versatile disc (DVD) into a High Definition (HD) image and displaying the HD image in an enlarged scale.

2. Description of the Related Art

In recent years, personal computers of various types such as a notebook type and desktop type have prevailed widely. Many personal computers of this type play back moving image data by software, and software including a resolution enhancement function of generating image data having a higher resolution than that of input image data appears recently. Various schemes associated with this resolution enhancement have begun to be proposed (for example, see Jpn. Pat. Appln. KOKAI Publication No. 2006-221221).

In conventional resolution enhancement processing, the number of pieces of edge (region where luminance values change steeply) information in one frame or the number of pixels, which are to undergo image-quality enhancement processing and are obtained from the edge information, are used intact as the number of execution times of image-quality enhancement image processing. Hence, the processing time varies depending on the number of pieces of edge information. When a frame includes many edges, the processing time exceeds a target processing time, thus causing frame omission or display delay.

Likewise, depending on the number of flat parts (regions where a change in luminance value is small), the processing time also varies, and the processing time exceeds a target processing time in some cases.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes an image quality improvement processing module which applies first image quality improvement processing for image quality enhancement to each of corresponding pixels in the temporary high-resolution image corresponding to a region other than the flat part region, and applies second image quality improvement processing for sharpening to each of corresponding pixels in the temporary high-resolution image corresponding to an edge region which is not located on the texture region. The apparatus further includes a controller which controls at least one of the texture determination reference value applied to the detecting the texture region and the flat part determination reference value applied to the detecting the flat part region based on a predetermined rule.

First Embodiment

Figure 1:
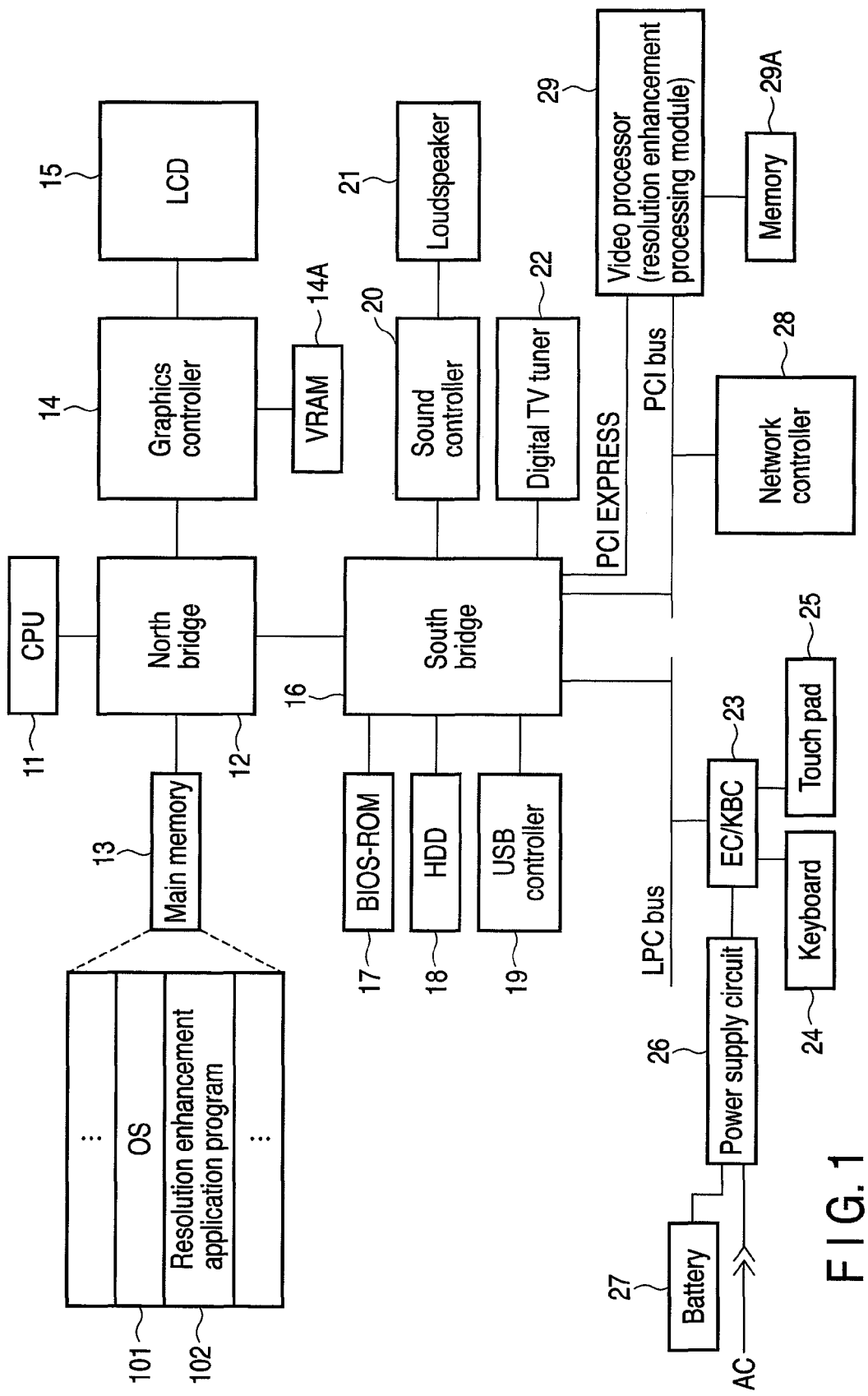
FIG. 1 is an exemplary block diagram showing an arrangement of an information processing apparatus according to a first embodiment of the invention.

FIG. 1 shows the arrangement of an information processing apparatus according to a first embodiment of the invention. This information processing apparatus is implemented as, for example, a notebook type personal computer which can be driven by a battery.

As shown in FIG. 1, this computer includes a CPU 11, north bridge 12, main memory 13, graphics controller 14, video memory (VRAM) 14A, liquid crystal display (LCD) 15, south bridge 16, BIOS-ROM 17, hard disc drive (HDD) 18, USB controller 19, sound controller 20, loudspeaker 21, digital TV tuner 22, embedded controller/keyboard controller IC (EC/KBC) 23, keyboard 24, touch pad 25, power supply circuit 26, battery 27, network controller 28 and video processor 29.

The CPU 11 is a processor which controls the operations of respective units in this computer. The CPU 11 executes an operating system (OS) 101 and various application programs loaded from the HDD 18 onto the main memory 13. These various application programs include a resolution enhancement application program 102. The CPU 11 also executes a BIOS stored in the BIOS-ROM 17. The BIOS is a program required to control various hardware components.

The north bridge 12 is a bridge device which connects between a local bus of the CPU 11 and the south bridge 16. The north bridge 12 includes a function of making communications with the graphics controller 14 via a bus. Also, the north bridge 12 incorporates a memory controller which controls accesses to the main memory 13. The graphics controller 14 is a display controller which controls the LCD 15 used as a display monitor of this computer. The number of pixels of the LCD 15 is, for example, 1920×1080 pixels. The graphics controller 14 generates a display signal to be output to the LCD 15 based on image data written in the VRAM 14A.

The south bridge 16 is a controller which controls various devices on a PCI bus and LPC bus. To this south bridge 16, the BIOS-ROM 17, HDD 18, USB controller 19, sound controller 20 and digital TV tuner 22 are connected. The HDD 18 is a storage device which stores various kinds of software and data. The USB controller 19 is a controller which controls various USB devices connected to this computer via a cable. The sound controller 20 is a sound source device, and outputs an audio signal to the loudspeaker 21. The digital TV tuner 22 is a receiving device which receives digital TV broadcast program data broadcast by a broadcast signal.

Furthermore, the south bridge 16 includes a function of controlling respective devices on the low pin count (LPC) bus and those on the (peripheral component interconnect (PCI) bus. Moreover, to the south bridge 16, the video processor 29 is connected via, for example, a serial bus complying with the PCI EXPRESS standard.

The video processor 29 is a processor, which executes resolution enhancement processing under the control of the resolution enhancement application program 102. The resolution enhancement processing is processing for enhancing the resolution of a moving image signal. This resolution enhancement processing is used to generate, for example, a moving image signal having an HD standard resolution (horizontal=1440 pixels×vertical=960 pixels) based on a moving image signal having an SD standard resolution (horizontal=720 pixels×vertical=480 pixels). A memory 29A is used as a work memory of the video processor 29.

In order to execute the resolution enhancement processing, a large arithmetic capacity is required. In this embodiment, the video processor 29 as a dedicated processor different from the CPU 11 is used as a backend processor, and executes the resolution enhancement processing. Hence, the resolution enhancement processing can be executed without increasing the load on the CPU 11.

The EC/KBC 23 is a 1-chip microcomputer which integrates an embedded controller for power management, and a keyboard controller required to control the keyboard 24 and touch pad 25. The EC/KBC 23 supplies electric power from the battery 27 or an external AC power supply to respective units in cooperation with the power supply circuit 26. The network controller 28 is a communication device which makes communications with external networks such as the Internet.

The resolution enhancement application program 102 executes processing for converting the resolution of a moving image signal to be displayed from the SD resolution to the HD resolution using the video processor 29. Hence, the resolution enhancement application program 102 and video processor 29 can function as a resolution enhancement apparatus for executing the resolution enhancement processing.

Figure 2:
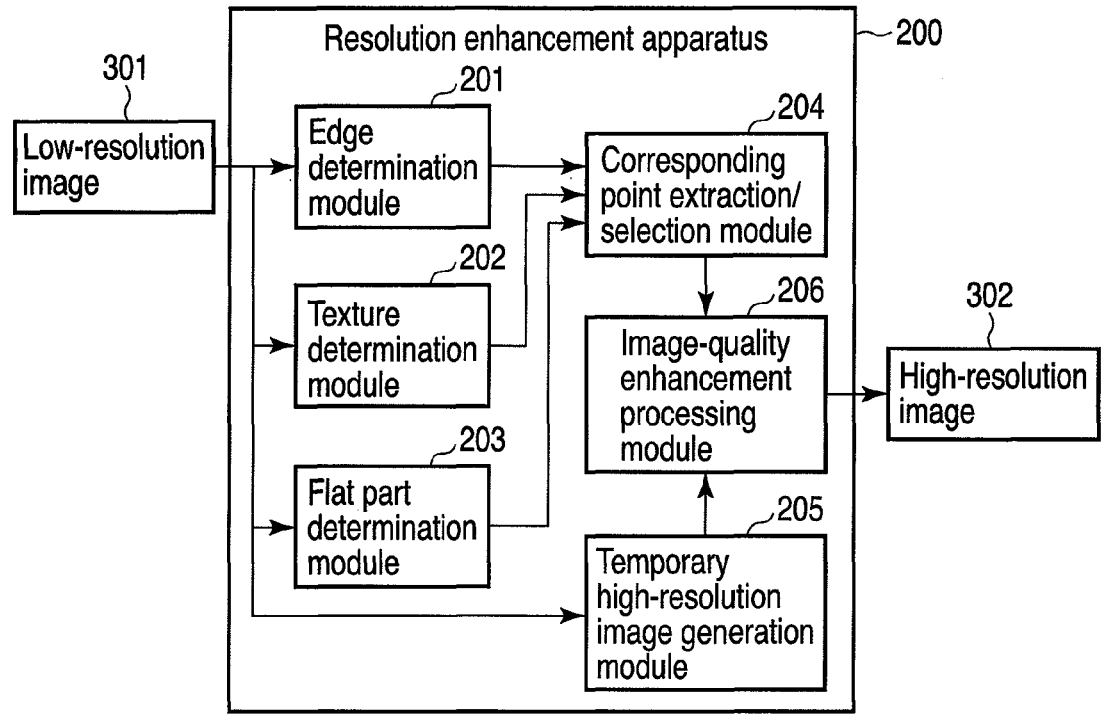
FIG. 2 is an exemplary block diagram showing a basic arrangement of a resolution enhancement apparatus which is applied to the information processing apparatus according to the first embodiment.

FIG. 2 shows the basic arrangement of a resolution enhancement apparatus 200 implemented by these resolution enhancement application program 102 and video processor 29.

This resolution enhancement apparatus 200 generates a high-resolution image 302 by enlarging a low-resolution image 301 and by applying image-quality enhancement processing such as sharpening to the enlarged image. The low-resolution image 301 is a moving image having SD resolution such as TV broadcast program data and Internet delivered video data. The high-resolution image 302 is, for example, a moving image signal having HD resolution. This resolution enhancement apparatus 200 includes an edge determination module 201, texture determination module 202, flat part determination module 203, corresponding point extraction/ selection module 204, temporary high-resolution image generation module 205, and image-quality enhancement processing module 206.

The edge determination module 201 detects edges (edge regions) included in each frame of a moving image signal input as the low-resolution image 301. The edge is a region where pixel values (luminance values) change steeply in an image. The edge detection is executed according to a predetermined edge determination reference value. As the edge detection, for example, a Sobel filter can be used. The edge determination module 201 outputs, as edge information, position information as an edge detection result.

The texture determination module 202 detects a texture region included in each frame of a moving image signal input as the low-resolution image 301. The texture is a region where a change in luminance value is regularly and continuously generated in an image. The texture detection is executed according to a predetermined texture determination reference value. The texture determination module 202 outputs, as texture information, position information as a texture detection result.

Furthermore, the flat part determination module 203 detects a flat part region included in each frame of a moving image signal input as the low-resolution image 301. The flat part is a region which includes a lower change in luminance value in an image and has neither an edge component nor a texture component. The flat part detection is executed according to a predetermined flat part determination reference value. The flat part determination module 203 outputs, as flat part information, position information as a flat part detection result.

The corresponding point extraction/selection module 204 extracts the positions of corresponding pixels (corresponding points) to which subsequent image-quality improvement processing (second image-quality improvement processing) is to be applied from a temporary high-resolution image to be described later using the edge information obtained by the edge determination module 201, the texture information obtained by the texture determination module 202 and the flat part information obtained by the flat part determination module 203. The module 204 executes processing for extracting pixels used in the subsequent image-quality improvement processing from the edge information in association with edge components. At this time, the module 204 sorts out, using the texture information, corresponding points extracted from edge components included in the texture region, so as not to use them in the subsequent image-quality improvement processing.

This resolution enhancement apparatus 200 applies former image-quality improvement processing (first image-quality improvement processing) for pixel positions of the entire low-resolution image as a source independently of corresponding points derived from the edges. This processing is called image-quality enhancement processing for a base part. Hence, the corresponding point extraction/selection module 204 also sorts out pixels, using the flat part information, so as to apply this image-quality enhancement processing for a base part to only a part other than the flat part region, where application of that processing is expected to be effective. That is, the corresponding point extraction/selection module 204 executes processing for selecting the positions of pixels to which the image-quality enhancement is to be applied from various kinds of information including the edge information, texture information, and flat part information.

The temporary high-resolution image generation module 205 generates a temporary high-resolution image as an enlarged image prior to application of the image-quality enhancement processing. That is, the temporary high-resolution image generation module 205 converts the resolution of each frame from the SD resolution into the HD resolution for respective frames of a moving image signal input as the low-resolution image 301, thereby generating a temporary high-resolution image having HD resolution. As an image enlargement method, for example, Cubic Convolution can be used.

The image-quality enhancement processing module 206 applies the aforementioned image-quality enhancement processing to pixels in the temporary high-resolution image corresponding to the corresponding points and base part selected by the corresponding point extraction/selection module 204. This processing is called sharpening, which converts the temporary high-resolution image obtained by the temporary high-resolution image generation module 205 into a sharper image. An image obtained by the image-quality enhancement processing by this image-quality enhancement processing module 206 is the high-resolution image 302. In the aforementioned sequence, the high-resolution image 302 is generated from each of frames of a moving image signal input as the low-resolution image 301, and is displayed on a display device such as the LCD 15.

The number of pixels to which the image-quality enhancement processing is applied by the image-quality enhancement processing module 206 varies depending on the number of corresponding pixels determined by the corresponding point extraction/selection module 204. Hence, the number of pixels to which the image-quality enhancement processing is applied is influenced by the number of edges detected by the edge determination module 201. Likewise, the number of pixels to which the image-quality enhancement processing is applied is influenced by the texture region as the texture determination result of the texture determination module 202, which influences this number of edges, and the flat part region as the flat part determination result of the flat part determination module 203, which influences the image-quality enhancement processing for a base part.

Figure 3:
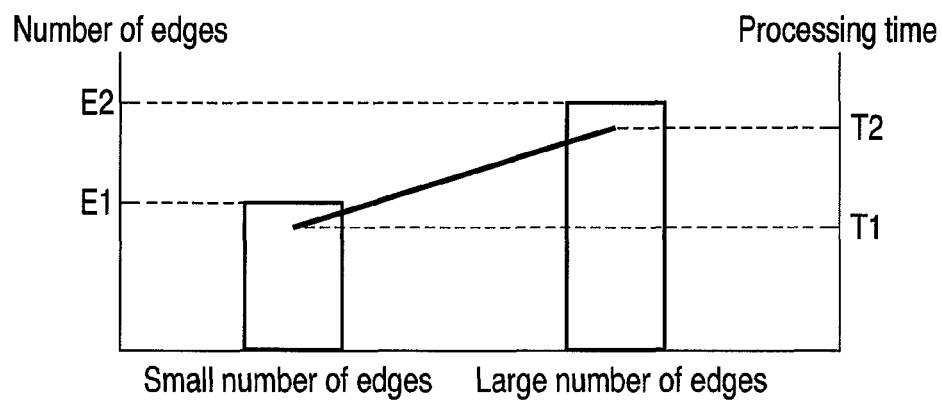
FIG. 3 is an exemplary graph showing the relationship between the number of edges of a moving image signal and a processing time required for resolution enhancement processing in the information processing apparatus according to the first embodiment.

That is, an arithmetic capacity for the image-quality enhancement processing by the image-quality enhancement processing module 206 for one pixel in the temporary high-resolution image generated by the temporary high-resolution image generation module 205 is constant. However, a processing time required for the image-quality enhancement processing per frame increases with increasing number of corresponding pixels decided by the processes of the edge determination module 201, texture determination module 202, flat part determination module 203, and corresponding point extraction/selection module 204. Taking edge components as an example, as shown in FIG. 3, when the low-resolution image 301 includes small edges (the number of edges=E1), a processing time required for the image-quality enhancement processing for one frame is T1. However, when the low-resolution image 301 includes many edges (the number of edges=E2), a processing time required for the image-quality enhancement processing for one frame is increased to T2 (T2>T1).

On the other hand, when a moving image signal obtained by this resolution enhancement apparatus 200 is to be displayed on the display device, the high-resolution image 302 for one frame has to be generated within a predetermined period of time. For example, upon playing back a moving image signal of 30 frames/sec, a time available to generate the high-resolution image 302 for one frame is about 33 msec. When a moving image signal including the large number of edges is input to this resolution enhancement apparatus 200, a time required to generate the high-resolution image 302 for one frame may exceed 33 msec. In this case, problems such as frame omissions and display delay occur in the display device.

Figure 4:
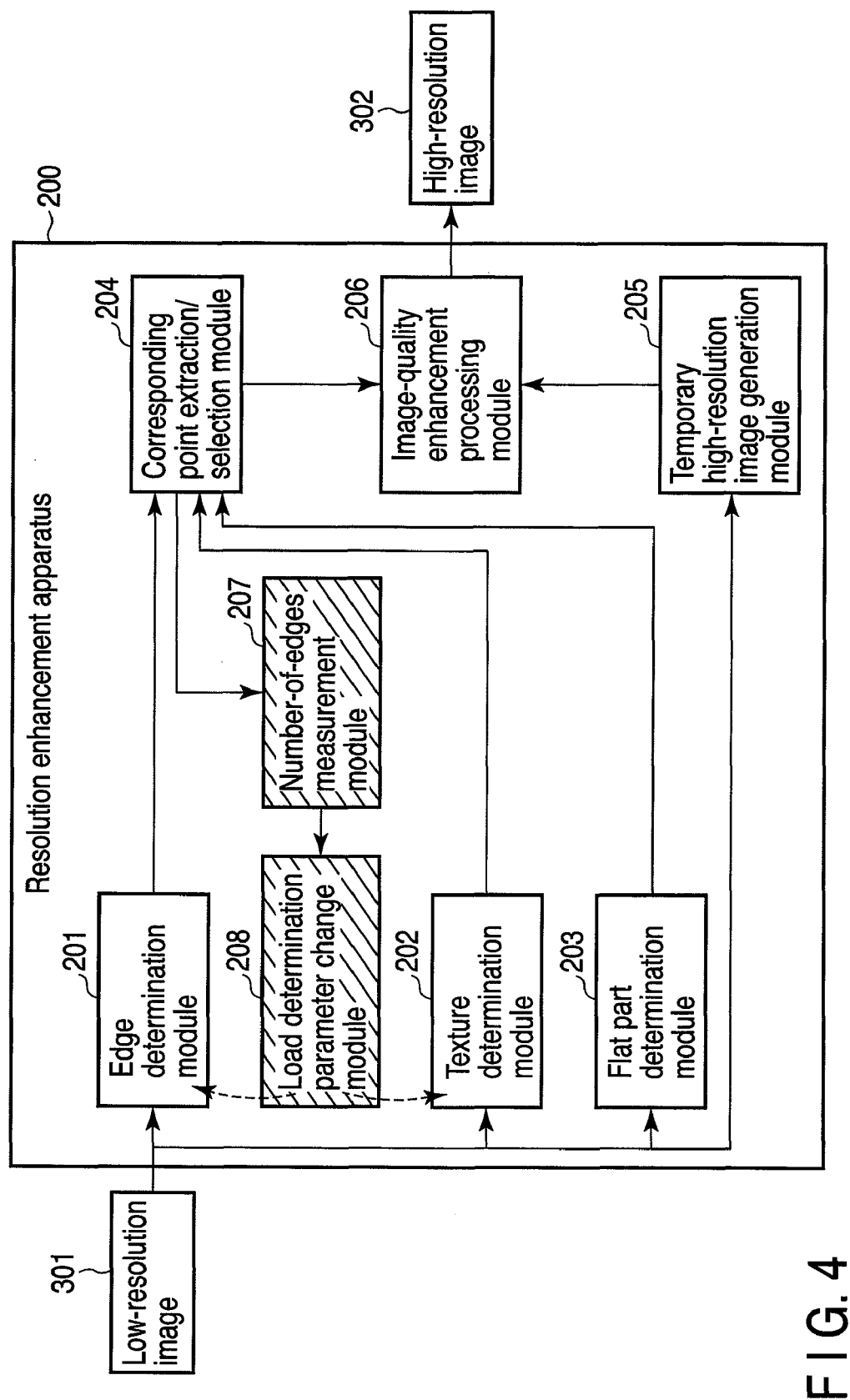
FIG. 4 is an exemplary block diagram showing an arrangement of an improved resolution enhancement apparatus which is applied to the information processing apparatus according to the first embodiment.

FIG. 4 shows the arrangement of an improved resolution enhancement apparatus 200 according to the first embodiment.

This resolution enhancement apparatus 200 further includes a number-of-edges measurement module 207 and load determination parameter change module 208 in addition to the edge determination module 201, texture determination module 202, flat part determination module 203, corresponding point extraction/selection module 204, temporary high-resolution image generation module 205, and image-quality enhancement processing module 206 described using FIG. 2.

A maximum processing time available for processing of one frame by the resolution enhancement apparatus 200 can be expressed by the following equation 1:

$$Tmax = Ec \times Tsearch\_squeeze + Ec \times Tsharpen + Bc \times Tsharpen \qquad \text{equation 1}$$

where Tmax: a maximum processing time available for the processing of one frame by the resolution enhancement apparatus;

Ec: the number of edges in a frame to be processed;

Bc: the number of pixels as a base part;

Tsearch_squeeze: a time required for the corresponding point extraction/selection processing per edge; and Tsharpen: a time required for the image-quality enhancement processing per pixel.

Ec indicates the number of edges which are to finally undergo the Tsearch_squeeze and Tsharpen processes. In this resolution enhancement apparatus 200, Ec is the number of corresponding points as a result of integrating the edge determination result of the edge determination module 201 and the texture determination result of the texture determination module 202. Also, Bc indicates the number of pixels of a base part, and a processing time required for the image-quality enhancement processing for a base part is a time obtained by multiplying this value and Tsharpen.

In the case of a video output of 30 frames/sec, Tmax is 33 msec. The Tsearch_squeeze and Tsharpen values are decided by the program execution speed of this computer. That is, the Tsearch_squeeze and Tsharpen values are fixed values decided by the processing performance of this computer. Hence, the maximum number of edges which meets Tmax, i.e., the maximum number of edges for which the computer can complete the resolution enhancement processing for one frame within a target processing time can be calculated using equation 1. Let En be this maximum number of edges.

Using this maximum number En of edges, the processing load can be controlled by adjusting the number of edges obtained from the edge determination result. Since the number of edges adjustment in the edge determination module 201 is described in Jpn. Pat. Appln. KOKAI Publication No. 2008-170167 filed by the present applicant, a description thereof will not be given. The load control using the maximum number En of edges and the texture region determination function of the texture determination module 202 will be described below.

The texture determination module 202 detects a texture region in a frame using a texture determination parameter thTexture as the aforementioned texture determination reference value (a threshold for a texture intensity). Assuming that the texture determination parameter thTexture assumes a large value, a pixel of interest is not determined as a texture unless its texture intensity is large. Therefore, when the parameter thTexture is increased, the texture region is decreased; when the parameter thTexture is decreased, the texture region is increased.

In this resolution enhancement apparatus 200, the corresponding point extraction/selection module 204 executes processing for excluding edge components included in the texture region determined by the texture determination module 202 from corresponding points of the image-quality enhancement processing. Therefore, by increasing the texture region by setting a small thTexture value, the number of corresponding points which are to undergo the image-quality enhancement processing is decreased.

The number-of-edges measurement module 207 measures the number of edges detected by the edge determination module 201 and used as corresponding points of each frame via sorting of the corresponding point extraction/selection module 204. The number of edges obtained by the number-of-edges measurement module 207 is that based on the result of texture determination that has already been executed by the texture determination module 202, the thTexture value adjusted by the load determination parameter change module 208 cannot be reflected to an identical frame. Therefore, the thTexture parameter changed by the load determination parameter change module 208 is valid in the next frame.

The load determination parameter change module 208 serves as a control unit which adjusts the texture determination parameter thTexture in the texture determination module 202 using the measurement result of the number-of-edges measurement module 207 and the maximum number En of edges which meets Tmax. The adjustment for increasing or decreasing the texture determination parameter thTexture is done when $$Ec > En$$

holds with respect to the number Ec of edges used as the corresponding points of that frame. At this time, the control for decreasing Ec by decreasing the thTexture value is executed (for the next frame). On the other hand, when Ec is equal to or smaller than En, the texture determination parameter thTexture and the number of edges are properly controlled by returning (increasing) thTexture to a proper value.

Figure 5:
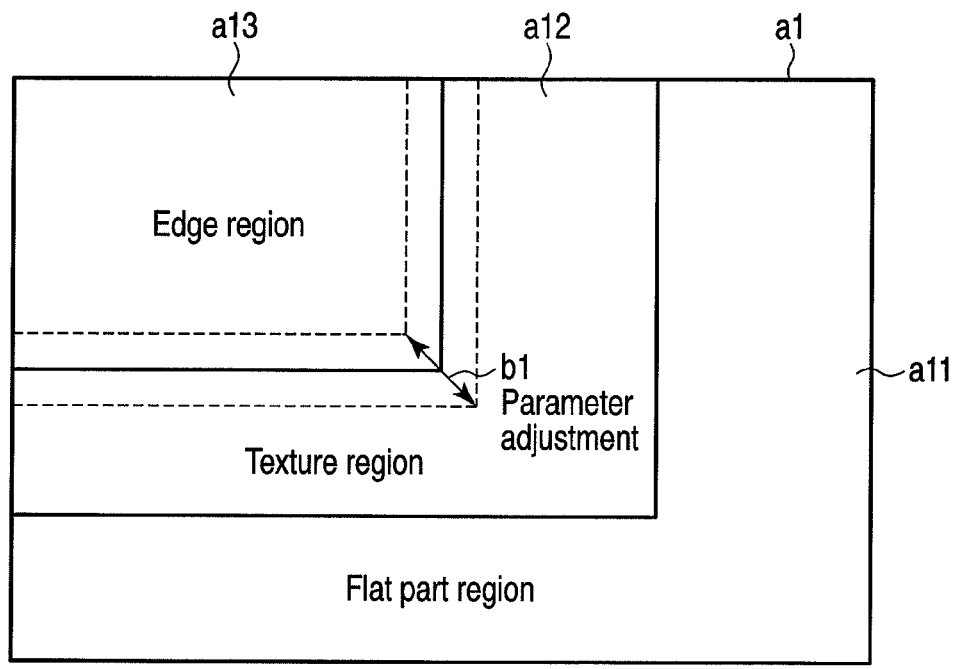
FIG. 5 is an exemplary schematic view showing the configuration of each frame to explain the principle of texture determination parameter adjustment executed by the information processing apparatus according to the first embodiment.

FIG. 5 is an exemplary schematic view showing the configuration of each frame to explain the principle of the control by this load determination parameter change module 208.

From each frame a1, the flat part determination module 203 detects a flat part region a11 which includes a lower change in luminance value and has neither an edge component nor a texture component. This flat part region a11 is excluded from the target of the image-quality enhancement processing for a base part. From each frame a1, the texture determination module 202 detects a texture region a12 where a change in luminance value is regularly and continuously generated. Of an edge region where pixel values change steeply and which is detected by the edge determination module 201, an edge region that exists on this texture region a12 is excluded from the target of the subsequent image-quality enhancement processing. Hence, by adjusting the texture determination reference value thTexture which dominates an increase or decrease of this texture region a12 (parameter adjustment b1), an increase or decrease of an edge region a13 which is to undergo the subsequent image-quality enhancement processing is adjusted.

The thTexture adjustment processing executed by the load determination parameter change module 208 will be described below with reference to the flowchart of FIG. 6.

In block A1, the edge determination module 201 and number-of-edges measurement module 207 detect edges and measure the number Ec of edges. The load determination parameter change module 208 compares the number Ec of edges with the maximum number En of edges to determine whether or not the number Ec of edges is larger than the maximum number En of edges (block A2).

If Ec>En, i.e., when the number Ec of edges is larger than the maximum number En of edges (YES in block A2), the load determination parameter change module 208 increases the value of the texture determination parameter thTexture so as to decrease the number Ec of edges of the next frame (block A3). If Ec>En does not hold (NO in block A2), the process of the load determination parameter change module 208 is skipped.

The load determination parameter change module 208 determines whether or not the number Ec of edges is sufficiently smaller than the maximum number En of edges (Ec<<En) and the current value of the texture determination parameter thTexture is larger than a default value (block A4). If conditions that Ec<<En and the current value of the texture determination parameter thTexture is larger than the default value are satisfied (YES in block A4), the load determination parameter change module 208 decreases the value of the texture determination parameter thTexture (block A5). In block A5, for example, processing for returning the value of the texture determination parameter thTexture to the default value is executed.

Figure 6:
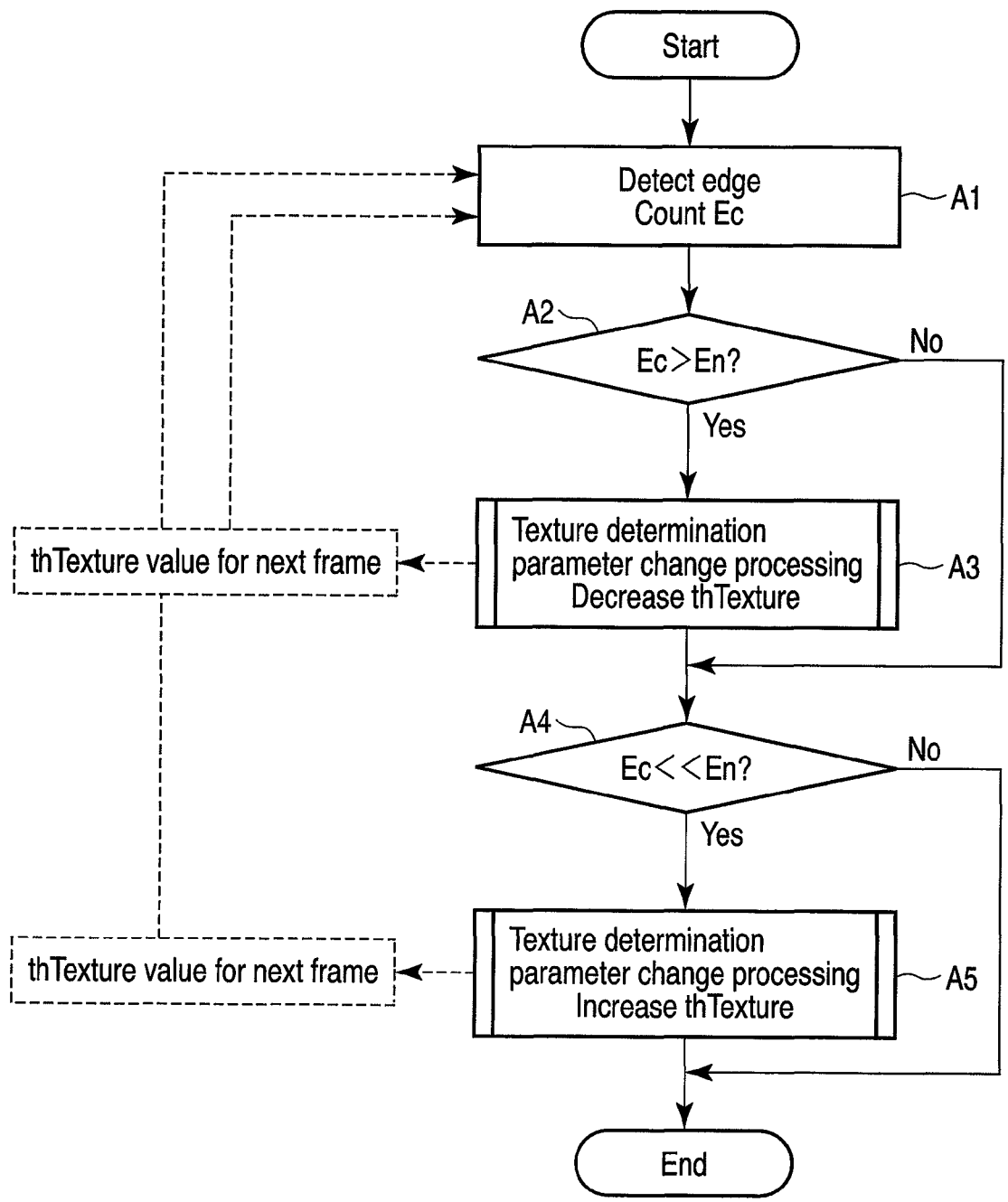
FIG. 6 is an exemplary flowchart showing a sequence of texture determination parameter adjustment processing executed by the information processing apparatus according to the first embodiment.

Note that as the determination condition used in block A4 in FIG. 6, a condition Ec=<En may be used in place of the condition Ec<<En.

As described above, the resolution enhancement apparatus 200 of this embodiment controls the number of edges by texture determination, and can reduce the processing load even for a moving image signal in which a time required for the resolution enhancement processing exceeds a target processing time, thereby adjusting a time required for the resolution enhancement processing to a proper value. Hence, the time required for the resolution enhancement processing per frame can be controlled to fall within a predetermined target time, and processing for displaying a resolution enhanced moving image signal on a high-resolution display in real time can be executed without causing any frame omission or the like.

Second Embodiment

The second embodiment of the present invention will be described below.

Figure 7:
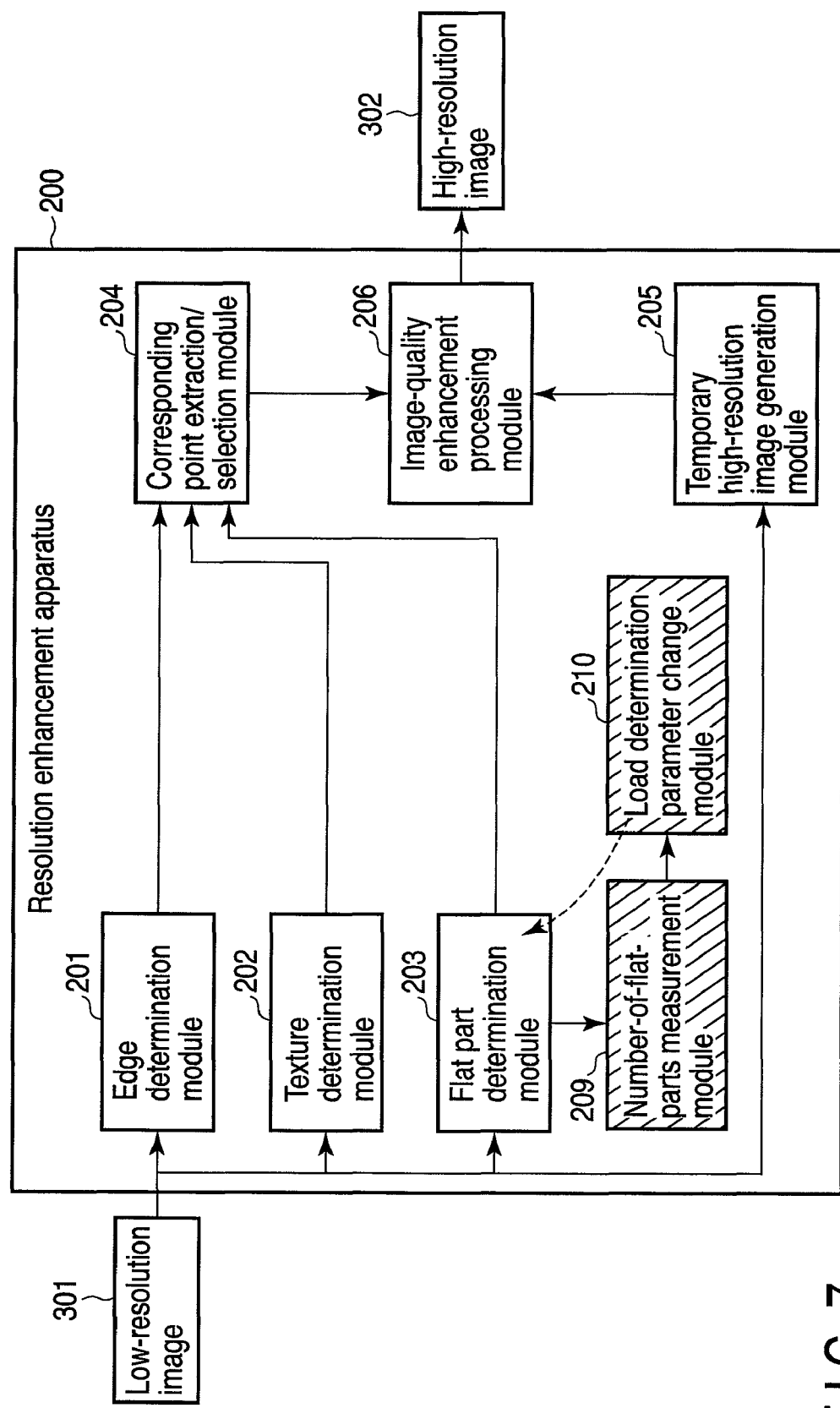
FIG. 7 is an exemplary block diagram showing an arrangement of an improved resolution enhancement apparatus which is applied to the information processing apparatus according to the second embodiment of the invention.

FIG. 7 shows the arrangement of an improved resolution enhancement apparatus 200 according to the second embodiment.

This resolution enhancement apparatus 200 further includes a number-of-flat-parts measurement module 209 and load determination parameter change module 210 in addition to the edge determination module 201, texture determination module 202, flat part determination module 203, corresponding point extraction/selection module 204, temporary high-resolution image generation module 205, and image-quality enhancement processing module 206 described using FIG. 2.

As described above, this resolution enhancement apparatus 200 executes image-quality enhancement processing corresponding to the number of pixels of an original image as the image-quality enhancement processing for a base part. However, the flat part region determined by the flat part determination module 203 is excluded from the image-quality enhancement processing for a base part by the image-quality enhancement processing module 206 by sorting it out by the corresponding point extraction/selection module 204. As described in the first embodiment as well, the processing time Tmax includes, as processing of this base part a processing time:

$Bc \times Tsharpen.$

Bc corresponds to the number of pixels of an original image when it assumes a maximum value. In the case of a frame unit, the value Bc increases/decreases depending on the flat part determination result by the flat part determination module 203. Let Bn be the maximum number of pixels defined to control the Tmax value to a constant processing time in association with the processing time given by Bc×Tsharpen. The Bn value varies depending on the system. Also, the Bn value has to be defined depending on system as well as a ratio with the processing time of an edge part. The flat part determination adjustment method by this resolution enhancement apparatus 200 will be described below.

The flat part determination module 203 detects a flat part region in a frame using a flat part determination parameter thFlat as the aforementioned flat part determination reference value (a threshold for flat part detection). If the flat part determination parameter thFlat assumes a large value, a pixel of interest is determined as a flat part if it has a large change in luminance value. That is, the flat part region is increased. On the other hand, if thFlat assumes a small value, the flat part region is decreased.

In the resolution enhancement apparatus 200, the corresponding point extraction/selection module 204 executes processing for excluding a region determined as the flat part region by the flat part determination module 203 from the image-quality enhancement processing for a base part. Therefore, by increasing thFlat, the image-quality enhancement processing for a base part is reduced.

The number-of-flat-parts measurement module 209 counts the number of pixels detected by the flat part determination module 203. Based on the value counted by the number-of-flat-parts measurement module 209, the flat part determination parameter thFlat for the next frame is calculated.

The load determination parameter change module 210 serves as a control unit which adjusts the flat part determination parameter thFlat in the flat part determination module 203 using the measurement result of the number-of-flat-parts measurement module 209 and Bn as the maximum number of pixels to be processed of the base condition which satisfies Tmax. The adjustment for increasing or decreasing the flat part determination parameter thFlat is executed when $Bc > Bn$ with respect to the number Bc of pixels to be processed of a base part in that frame. At this time, the control for decreasing Bc is executed by increasing the thFlat value (for the next frame). On the other hand, when Bc is equal to or smaller than Bn, the flat part determination parameter thFlat and the number Bc of pixels to be processed of a base part are properly controlled by returning (decreasing) thFlat to a proper value.

Figure 8:
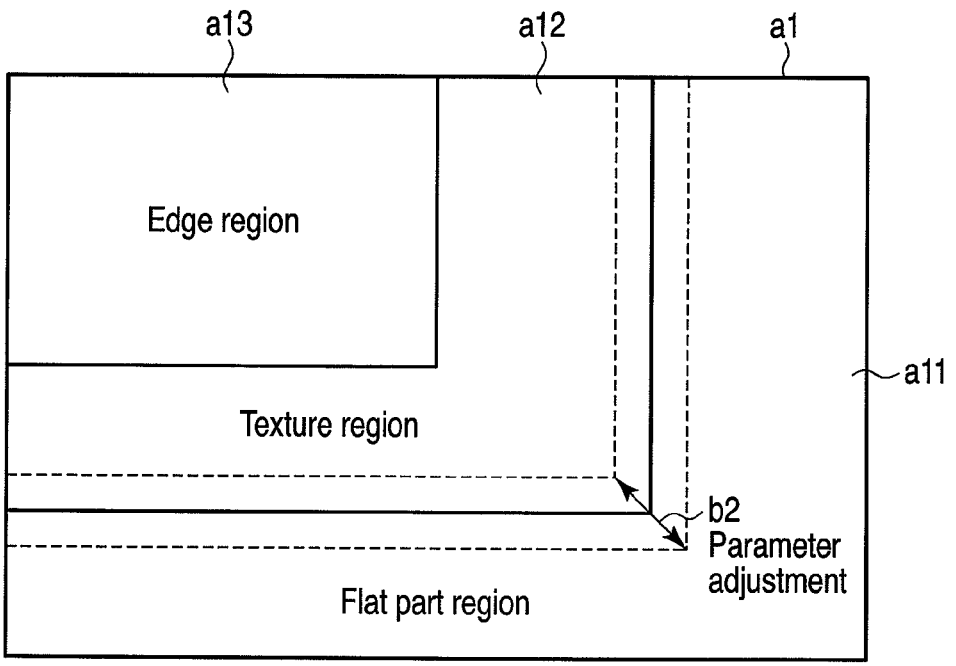
FIG. 8 is an exemplary schematic view showing the configuration of each frame to explain the principle of flat part determination parameter adjustment executed by the information processing apparatus according to the second embodiment.

FIG. 8 is an exemplary schematic view showing the configuration of each frame to explain the principle of the control performed by this load determination parameter change module 210.

In the aforementioned first embodiment, by adjusting the texture determination reference value thTexture which dominates an increase or decrease of the texture region a12, an increase or decrease of the edge region a13, which is to undergo the subsequent image-quality enhancement processing, is adjusted. By contrast, in this second embodiment, the flat part determination reference value thFlat which dominates an increase or decrease of the flat part region a11 to be excluded from the target of the image-quality enhancement processing for a base part is adjusted (parameter adjustment b2).

The thFlat adjustment processing executed by the load determination parameter change module 210 will be described below with reference to the flowchart of FIG. 9.

In block B1, the flat part determination module 203 and number-of-flat-parts measurement module 209 detect flat parts and measure the number Bc of flat parts. The load determination parameter change module 210 compares the number Bc of flat parts with the maximum number Bn of pixels to determine whether or not the number Bc of pixels to be processed of a base part is larger than the maximum number Bn of pixels (block B2).

If Bc>Bn, i.e., when the number Bc of pixels to be processed of a base part is larger than the maximum number Bn of pixels (YES in block B2), the load determination parameter change module 210 increases the value of the flat part determination parameter thFlat to decrease the number Bc of pixels to be processed of a base part for the next frame (block B3). If Bc>Bn does not hold (NO in block B2), the process of the load determination parameter change module 210 is skipped.

Next, the load determination parameter change module 210 determines whether or not the number Bc of pixels to be processed of a base part is sufficiently smaller than the maximum number Bn of pixels (Bc<<Bn), and the current value of the flat part determination parameter thFlat is larger than a default value (block B4). If conditions that Bc<<Bn and the current value of the flat part determination parameter thFlat is larger than the default value are satisfied (YES in block B4), the load determination parameter change module 210 decreases the value of the flat part determination parameter thFlat (block B5). In block B5, for example, processing for returning the value of the flat part determination parameter thFlat to the default value is executed.

Figure 9:
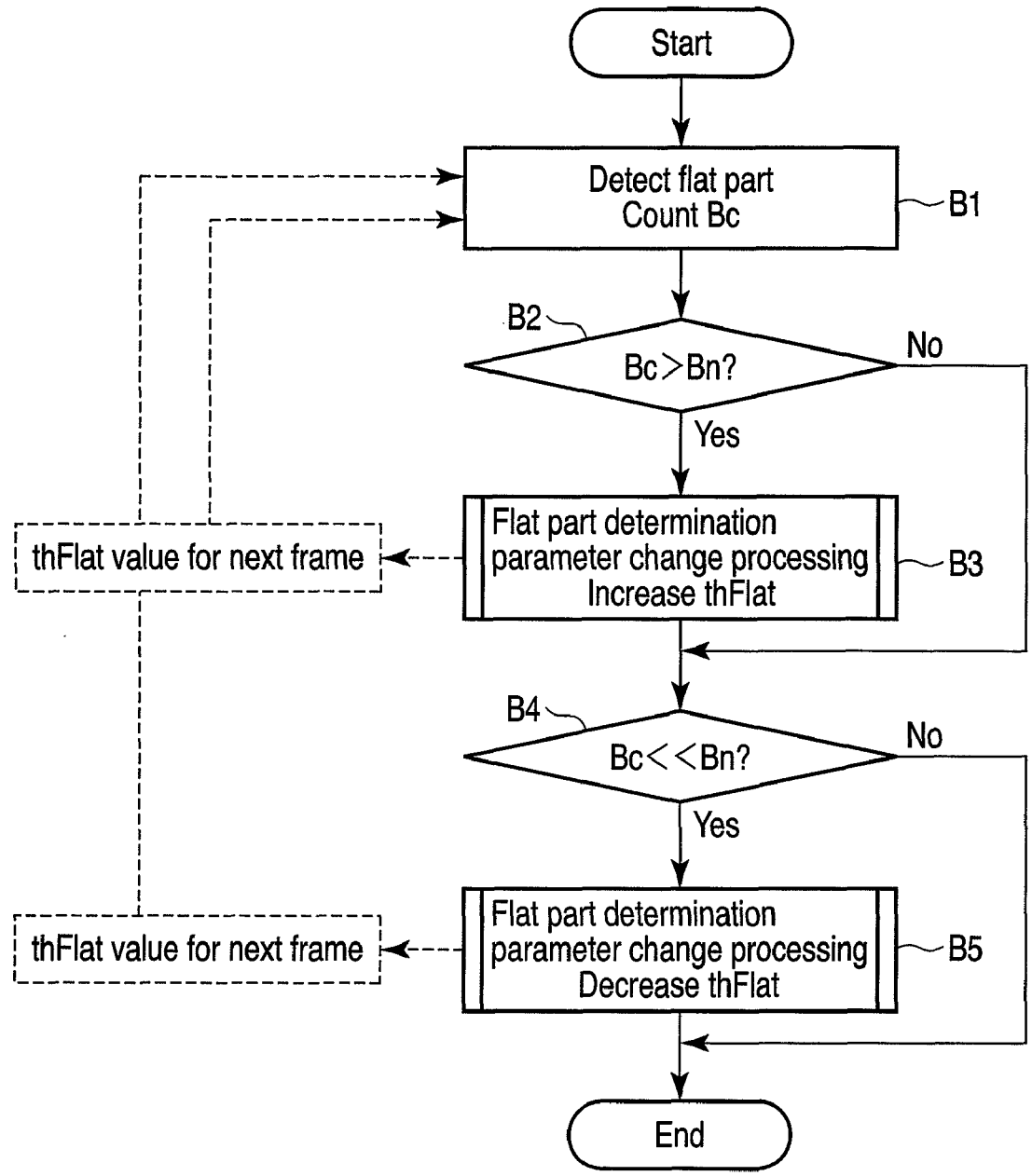
FIG. 9 is an exemplary flowchart showing a sequence of flat part determination parameter adjustment processing executed by the information processing apparatus according to the second embodiment.

Note that as the determination condition used in block B4 in FIG. 9, a condition Bc×Bn may be used in place of the condition Bc<<Bn.

As described above, the resolution enhancement apparatus 200 of this embodiment controls the number of flat parts by the flat part determination, and can reduce the processing load even for a moving image signal in which a time required for the resolution enhancement processing exceeds a target processing time, thereby adjusting a time required for the resolution enhancement processing to a proper value. Hence, the time required for the resolution enhancement processing per frame can be controlled to fall within a predetermined target time, and processing for displaying a resolution enhanced moving image signal on a high-resolution display in real time can be executed without causing any frame omission.

Third Embodiment

The third embodiment of the present invention will be described below.

Figure 10:
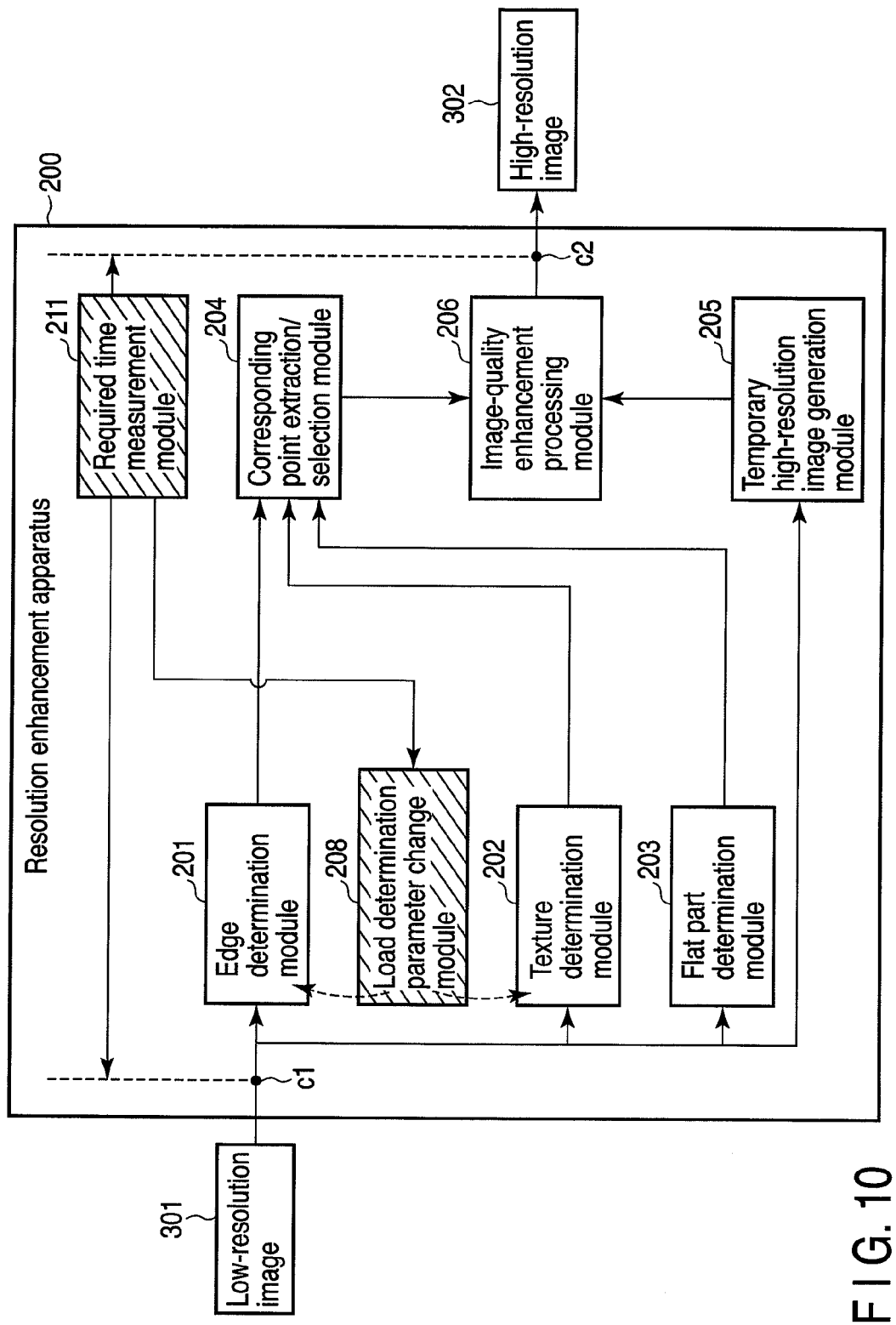
FIG. 10 is an exemplary block diagram showing an arrangement of an improved resolution enhancement apparatus which is applied to the information processing apparatus according to the third embodiment of the invention.

FIG. 10 shows the arrangement of an improved resolution enhancement apparatus 200 according to the third embodiment.

The aforementioned first embodiment has exemplified the case in which the number of edges obtained from the edge determination result is adjusted using the maximum number of edges so as to control the processing load. By contrast, in the third embodiment, the number of edges obtained from the edge determination result is adjusted using a required time from when the low-resolution image 301 is input until the corresponding high-resolution image 302 is output, thereby controlling the processing load. For this purpose, the resolution enhancement apparatus 200 of the third embodiment includes a required time measurement module 211 which measures a required time from when the low-resolution image 301 is input until the corresponding high-resolution image 302 is output, in place of the number-of-edges measurement module 207 of the resolution enhancement apparatus 200 of the first embodiment shown in FIG. 4.

The load determination parameter change module 208 of the third embodiment serves as a control unit which adjusts the texture determination parameter thTexture in the texture determination module 202 using a measurement result (Tc) of this required time measurement module 211. Let Tn be a target processing time of the resolution enhancement processing. The load control using the measurement result of the required time measurement module 211, i.e., the thTexture adjustment processing executed by the load determination parameter change module 208 will be described below with reference to the flowchart of FIG. 11.

In block C1, the required time measurement module 211 measures a required time Tc. The load determination parameter change module 208 compares the required time Tc with the target processing time Tn to determine whether or not the required time Tc is longer than the target processing time Tn (block C2).

If Tc>Tn, i.e., when the required time Tc is longer than the target processing time Tn (YES in block C2), the load determination parameter change module 208 increases the value of the texture determination parameter thTexture so as to decrease the number of edges for the next frame (block C3). If Tc>Tn does not hold (NO in block C2), the process of the load determination parameter change module 208 is skipped.

Next, the load determination parameter change module 208 determines whether or not the required time Tc is sufficiently shorter than the target processing time Tn (Tc<<Tn), and the current value of the texture determination parameter thTexture is larger than a default value (block C4). If conditions that Tc<<Tn and the current value of the texture determination parameter thTexture is larger than the default value are satisfied (YES in block C4), the load determination parameter change module 208 decreases the value of the texture determination parameter thTexture (block C5). In block C5, for example, processing for returning the value of the texture determination parameter thTexture to the default value is executed.

Figure 11:
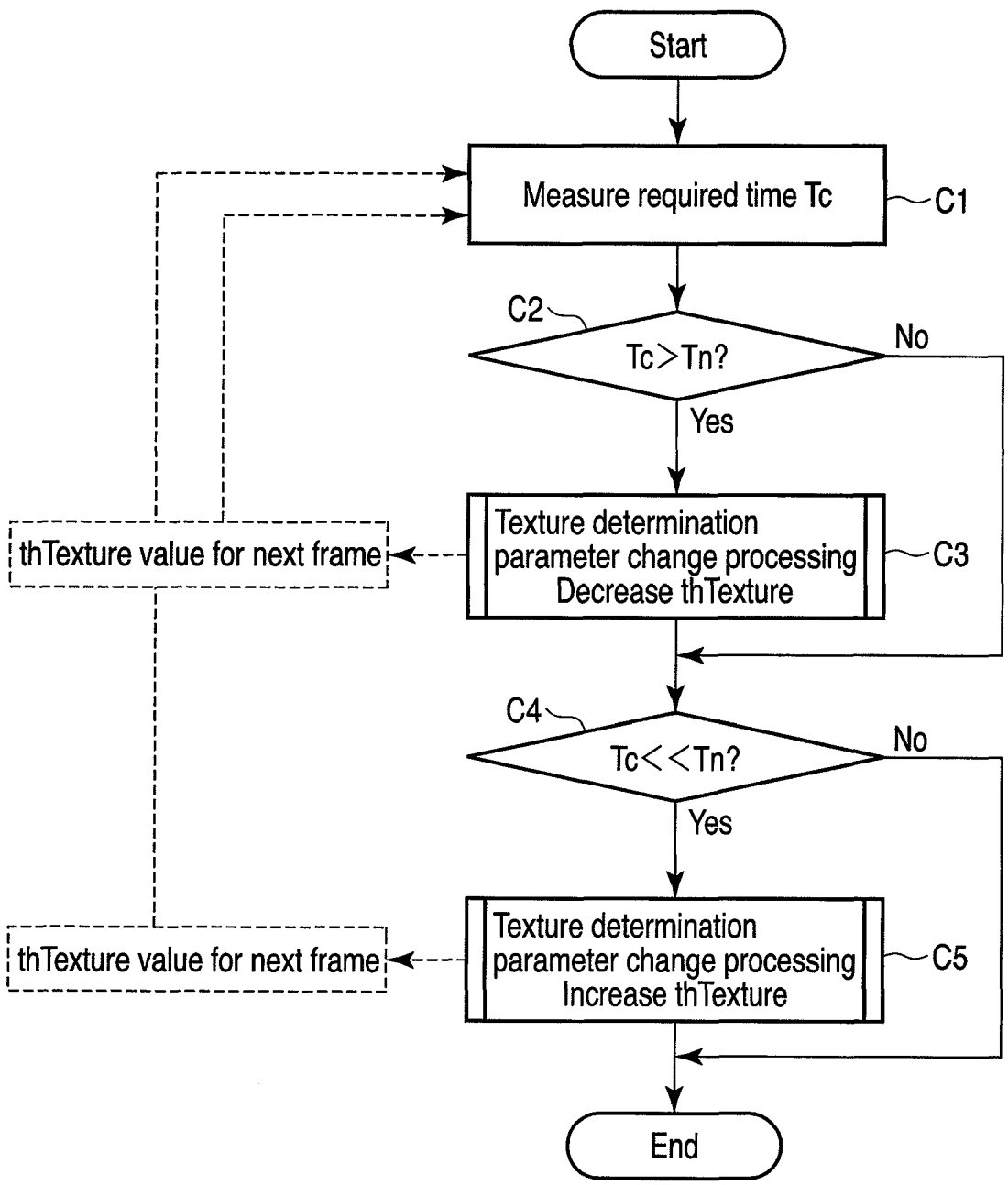
FIG. 11 is an exemplary flowchart showing a sequence of texture determination parameter adjustment processing executed by the information processing apparatus according to the third embodiment.

Note that as the determination condition used in block C4 in FIG. 11, a condition Tc=<Tn may be used in place of the condition Tc<<Tn.

As described above, the resolution enhancement apparatus 200 of this embodiment controls the number of edges by the texture determination via monitoring of a required time, and can reduce the processing load even for a moving image signal in which a time required for the resolution enhancement processing exceeds a target processing time, thereby adjusting a time required for the resolution enhancement processing to a proper value. Hence, the time required for the resolution enhancement processing per frame can be controlled to fall within a predetermined target time, and processing for displaying a resolution enhanced moving image signal on a high-resolution display in real time or the like can be executed without causing any frame omission or the like.

Fourth Embodiment

The fourth embodiment of the present invention will be described below.

Figure 12:
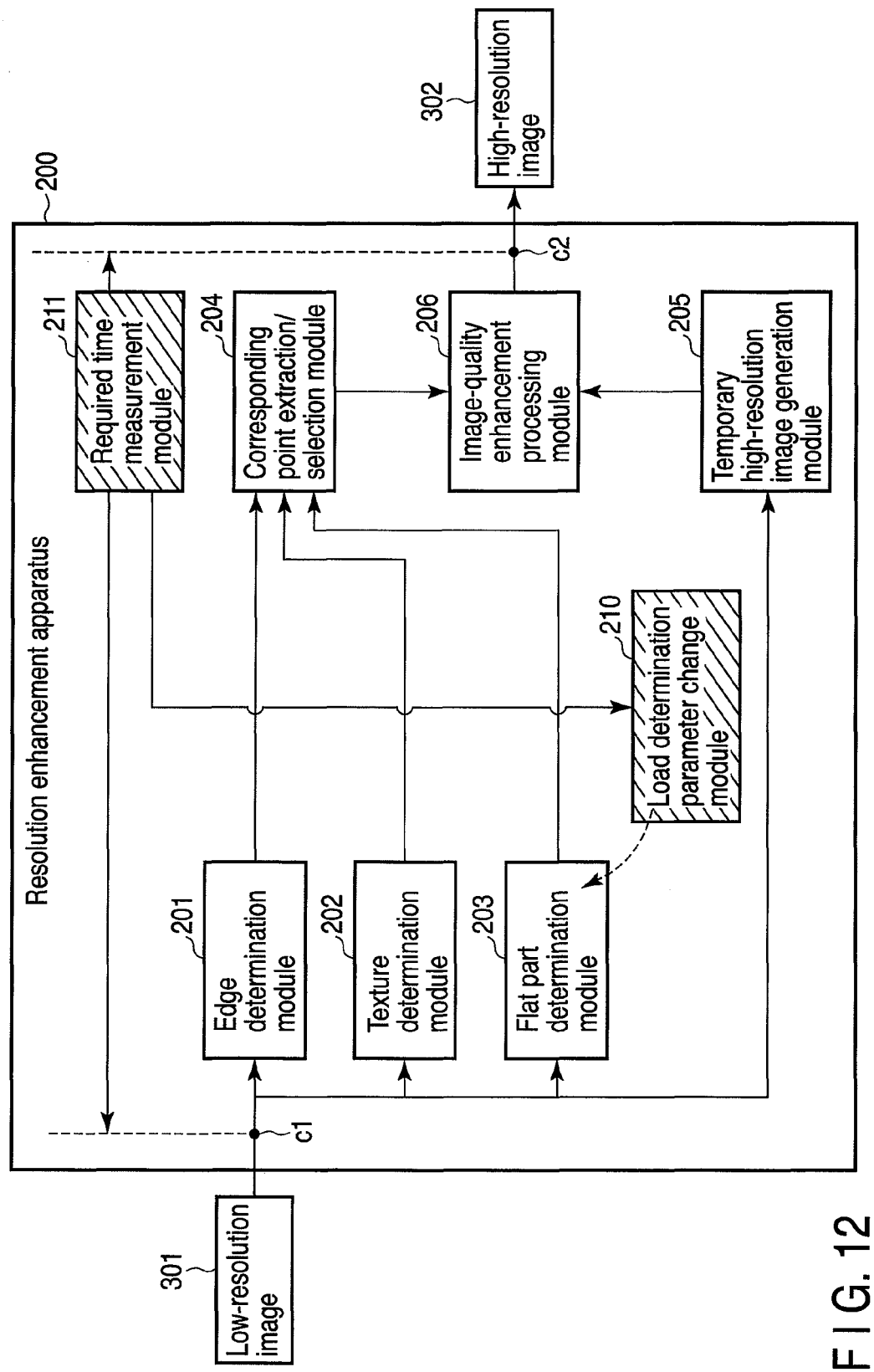
FIG. 12 is an exemplary block diagram showing an arrangement of an improved resolution enhancement apparatus which is applied to the information processing apparatus according to the fourth embodiment of the invention.

FIG. 12 shows the arrangement of an improved resolution enhancement apparatus 200 according to the fourth embodiment.

The aforementioned second embodiment has exemplified the case in which the number of flat parts obtained from the flat part determination result is adjusted using the maximum number of base pixels, thereby controlling the processing load. By contrast, in the fourth embodiment, the number of flat parts obtained from the flat part determination result is adjusted using a required time from when the low-resolution image 301 is input until the corresponding high-resolution image 302 is output, thereby controlling the processing load. For this purpose, the resolution enhancement apparatus 200 of the fourth embodiment includes a required time measurement module 211 which measures a required time from when the low-resolution image 301 is input until the corresponding high-resolution image 302 is output, in place of the number-of-flat-parts measurement module 209 of the resolution enhancement apparatus 200 of the second embodiment shown in FIG. 7.

The load determination parameter change module 210 of the fourth embodiment serves as a control unit which adjusts the flat part determination parameter thFlat in the flat part determination module 203 using a measurement result (Tc) of this required time measurement module 211. Let Tn be a target processing time of the resolution enhancement processing. The load control using the measurement result of the required time measurement module 211, i.e., the thFlat adjustment processing executed by the load determination parameter change module 210 will be described below with reference to the flowchart of FIG. 13.

In block D1, the required time measurement module 211 measures a required time Tc. The load determination parameter change module 210 compares the required time Tc with the target processing time Tn to determine whether or not the required time Tc is longer than the target processing time Tn (block D2).

If Tc>Tn, i.e., when the required time Tc is longer than the target processing time Tn (YES in block D2), the load determination parameter change module 210 increases the value of the flat part determination parameter thFlat so as to decrease the number of pixels of a base part for the next frame (block D3). If Tc>Tn does not hold (NO in block D2), the process of the load determination parameter change module 210 is skipped.

Next, the load determination parameter change module 210 determines whether or not the required time Tc is sufficiently shorter than the target processing time Tn (Tc<<Tn), and the current value of the flat part determination parameter thFlat is larger than a default value (block D4). If conditions that Tc<<Tn and the current value of the flat part determination parameter thFlat is larger than the default value are satisfied (YES in block D4), the load determination parameter change module 210 decreases the value of the flat part determination parameter thFlat (block D5). In block D5, for example, processing for returning the value of the flat part determination parameter thFlat to the default value is executed.

Figure 13:
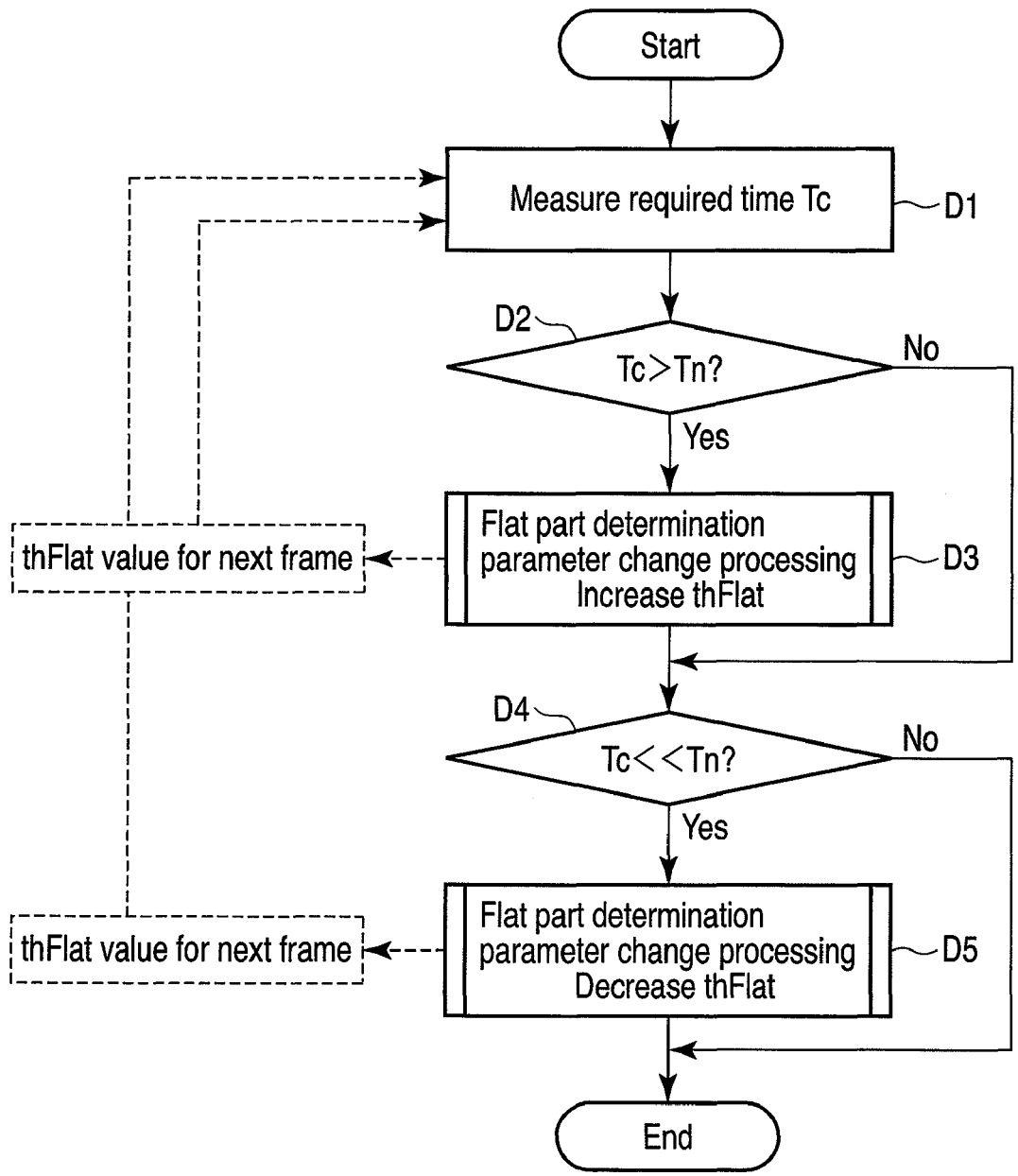
FIG. 13 is an exemplary flowchart showing a sequence of flat part determination parameter adjustment processing executed by the information processing apparatus according to the fourth embodiment.

Note that as the determination condition used in block D4 in FIG. 13, a condition Tc=<Tn may be used in place of the condition Tc<<Tn.

As described above, the resolution enhancement apparatus 200 of this embodiment controls the number of flat parts by the flat part determination via monitoring of a required time, and can reduce the processing load even for a moving image signal in which a time required for the resolution enhancement processing exceeds a target processing time, thereby adjusting a time required for the resolution enhancement processing to a proper value. Hence, the time required for the resolution enhancement processing per frame can be controlled to fall within a predetermined target time, and processing for displaying a resolution enhanced moving image signal on a high-resolution display in real time or the like can be executed without causing any frame omission or the like.

Note that the computer has been exemplified as the information processing apparatus. However, the information processing apparatus is not limited to the computer, and a digital TV, set top box, and the like may be used. Also, all processes of the resolution enhancement apparatus can be implemented by programs. In this case, by merely installing and executing a program of this software in a normal computer via a computer readable storage medium, the same effects as those of this embodiment can be easily attained.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus configured to execute resolution enhancement in order to generate a second moving image signal with a second resolution from a first moving image signal with a first resolution lower than the second resolution, the information processing apparatus comprising:

an edge detection module configured to detect an edge region in which luminance values are changed to values beyond a predetermined edge determination reference value in a to-be-processed frame of the first moving image signal with the first resolution;

a texture detection module configured to detect a texture region where a change in luminance value is substantially regular and continuous in the to-be-processed frame based on a predetermined texture determination reference value;

a flat region detection module configured to detect a flat region where a change in luminance value is smaller than a predetermined flat region determination reference value in the to-be-processed frame;

a resolution convertor configured to generate a temporary high-resolution image with the second resolution by converting a resolution of the to-be-processed frame from the first resolution to the second resolution;

an image quality improvement module configured to execute first image quality improvement processing in order to enhance image quality of pixels in the temporary high-resolution image corresponding to a region other than the detected flat region, and to execute second image quality improvement processing in order to sharpen the pixels in the temporary high-resolution image corresponding to the detected edge region not in the detected texture region; and a controller configured to adjust the texture determination reference value in order to limit a time of the resolution enhancement per frame within a predetermined time.

2. An information processing apparatus configured to execute resolution enhancement in order to generate a second moving image signal with a second resolution from a first moving image signal with a first resolution lower than the second resolution, the information processing apparatus comprising:

an edge detection module configured to detect an edge region in which luminance values are changed to values beyond a predetermined edge determination reference value in a to-be-processed frame of the first moving image signal with the first resolution;

a texture detection module configured to detect a texture region where a change in luminance value is substantially regular and continuous in the to-be-processed frame based on a predetermined texture determination reference value;

a flat region detection module configured to detect a flat region where a change in luminance value is smaller than a predetermined flat region determination reference value in the to-be-processed frame;

a resolution convertor configured to generate a temporary high-resolution image with the second resolution by converting a resolution of the to-be-processed frame from the first resolution to the second resolution;

an image quality improvement module configured to execute first image quality improvement processing in order to enhance image quality of pixels in the temporary high-resolution image corresponding to a region other than the detected flat region, and to execute second image quality improvement processing in order to sharpen the pixels in the temporary high-resolution image corresponding to the detected edge region not in the detected texture region; and a controller configured to adjust the flat region determination reference value in order to limit a time of the resolution enhancement per frame from within a predetermined time.

3. A computer readable medium having stored thereon a resolution enhancement processing control program, causes a computer to:

generate a second moving image signal with a second resolution from a first moving image signal with a first resolution lower than the second resolution;

detect an edge region in which luminance values are changed to values beyond a predetermined edge determination reference value in a to-be-processed frame of the first moving image signal with the first resolution;

detect a texture region where a change in luminance value is substantially regular and continuous in the to-be-processed frame based on a predetermined texture determination reference value;

detect a flat region where a change in luminance value is smaller than a predetermined flat region determination reference value in the to-be-processed frame;

generate a temporary high-resolution image with the second resolution by converting a resolution of the to-be-processed frame from the first resolution to the second resolution;

execute first image quality improvement processing in order to enhance image quality of pixels in the temporary high-resolution image corresponding to a region other than the detected flat region;

execute second image quality improvement processing in order to sharpen the pixels in the temporary high-resolution image corresponding to the detected edge region not in the detected texture region; and adjust the texture determination reference value in order to limit a time of the resolution enhancement per frame within a predetermined time.

* * * * *